United States Patent [19]
Mathis

[11] Patent Number: 5,530,243
[45] Date of Patent: Jun. 25, 1996

[54] FORMATION DENSITY WELL LOGGING TOOL WITH DETECTOR ARRAY FOR COMPENSATION OF WELLBORE ROUGHNESS AND TOOL TILT

[75] Inventor: Gary L. Mathis, Houston, Tex.

[73] Assignee: Western Atlas International, Inc., Houston, Tex.

[21] Appl. No.: 521,174

[22] Filed: Aug. 30, 1995

[51] Int. Cl.$^6$ .................................................. G01V 5/12
[52] U.S. Cl. ............................. 250/269.3; 250/269.1; 250/266; 250/264; 250/256
[58] Field of Search .................... 250/269.3, 266, 250/264, 269.1, 256

[56] References Cited

U.S. PATENT DOCUMENTS

| | | | |
|---|---|---|---|
| 3,321,625 | 5/1967 | Wahl | 250/71.5 |
| 4,048,495 | 9/1977 | Ellis | 250/269.3 |
| 4,661,700 | 4/1987 | Holenka | 250/256 |
| 5,390,115 | 2/1995 | Case et al. | 250/269.3 |

*Primary Examiner*—Constantine Hannaher
*Assistant Examiner*—Virgil Orlando Tyler
*Attorney, Agent, or Firm*—Richard A. Fagin

[57] ABSTRACT

A method for determining density of a formation. The method includes irradiating the formation with gamma rays having energy consistent with Compton scattering. Gamma rays are measured at axially spaced apart locations. Two of the axially spaced apart locations are at an equal distance and in opposite directions relative to the source of gamma rays. The distance is smaller than the spacing of another one of the spaced apart locations. An apparent density for each spaced apart location is determined from the counts. Differences are calculated in apparent density between each one of the spaced apart locations, and a correction factor is determined for apparent density at each spaced apart location, thereby determining the density of the earth formation. In a preferred embodiment, determining correction factors is performed by a neural network using the differences in apparent density as an input vector.

14 Claims, 4 Drawing Sheets

FORMATION DENSITY WELL LOGGING TOOL WITH DETECTOR ARRAY FOR COMPENSATION OF WELLBORE ROUGHNESS AND TOOL TILT

BACKGROUND OF THE INVENTION

1. Field of the Invention

The present invention is related to the field of wellbore logging instruments. More specifically, the present invention is related to instruments which measure bulk density of earth formations. The instrument of the present invention includes a plurality of sensors used for compensating the measurements of bulk density for tilting of the instrument and for roughness of the wall of the wellbore.

2. Description of the Related Art

Well logging instruments are used to evaluate earth formations penetrated by wellbores for the presence of useful materials such as petroleum. Well logging instruments are typically lowered into the wellbore at one end of an armored electrical cable which conducts power to me instruments and returns measurement signals to the earth's surface for recording and observation. The instruments include sensors which measure various properties of the earth formations.

Measurement of the bulk density of the earth formation is particularly useful. Bulk density measurements are used for, among other things, determining the fractional volume of pore space in the earth formation in which fluids such as oil and gas may be present, determining the mineral composition of the earth formation and for determining the weight, or overburden force, of the earth formation at any particular depth in the wellbore.

Well logging instruments known in the art for determining bulk density of the earth formation are typically derived from an instrument disclosed in U.S. Pat. No. 3,321,625 issued to Wahl. The instrument in the Wahl '625 patent includes a source of gamma rays having a predetermined energy magnitude. The source is typically a steady-state, isotopic chemical source such as cesium-137. The tool includes two gamma-ray photon detectors positioned at spaced apart locations from the source. The source and detectors are typically disposed in a high-density (typically metallic tungsten) "pad" or "skid" mounted to one side of the tool, which restricts the gamma ray output of the source to be principally in the direction of the earth formation, and controls the entry of gamma rays into the detectors to be primarily from the direction of the earth formation. The skid is typically placed into firm contact with the wall of the wellbore by means of a powered, extensible arm directed from the opposite side of the tool on which the skid is located. Gamma rays from the source can interact with electrons orbiting atoms in the materials forming the earth formation. Each interaction can cause a gamma ray to lose some of its energy and be deflected from its original direction of travel. The source is typically selected so that the original energy magnitude of the gamma rays facilitates this type of interaction, known as Compton scattering. The rate at which gamma rays lose energy and are deflected from their original directions is related to both the electron density of the earth formation (the number of electrons per unit volume of the formation) and the distance between the source and the detector. Some gamma rays can survive the Compton scattering process and return to the detectors. The counting rate at any one of the detectors resulting from Compton-scattered gamma rays can be described by the relationship:

$$I = I_o e^{-\mu x} \quad (1)$$

where $I$ is the count rate at a detector having a spacing $x$ from the source, $I_o$ is the count rate at zero spacing from the source, and $\mu$ is an "absorption" coefficient which is related to the electron density of the earth formation in contact with the skid and axially interposed between the source and detector. For most materials from which earth formations are typically composed, electron density is directly related to bulk density, so the measurements of detector count rates can be directly scaled into measurements of bulk density of the formation by using the relationship in equation (1).

As is disclosed in the Wahl '625 patent, the skid typically does not perfectly contact the wall of the wellbore. Wellbores are typically drilled with a fluid suspension, called "drilling mud" in which solid components of the suspension "plate out" to form an impermeable barrier across earth formations which have lower fluid pressure than the hydrostatic pressure of the fluid column of drilling mud in the wellbore. The impermeable barrier, called "mud filtrate" or "mud cake", can in some instances exceed one inch in thickness. The mud filtrate would therefore typically be interposed between the skid and the wall of the wellbore. The instrument in the Wahl '625 patent provides a form of compensation for the interposition of mud filtrate between the wellbore wall and the skid by using two detectors at different axially spaced apart locations from the source. The detector positioned at the greater axial distance from the source (the "far-spacing" detector) will be responsive to gamma rays which have interacted with electrons at a greater radial distance from the wall of the wellbore than those reaching the other detector (the "near-spacing" detector). As is disclosed in the Wahl '625 patent, an empirical relationship is devised which relates the count rates at both detectors to a bulk density of the earth formation and a "correction" for various thicknesses and densities of mud cake. The empirical relationship is typically devised by inserting the tool into media of known bulk densities and including simulated "mud cake", typically rubber or plastic sleeves, of known densities and thicknesses in between the skid and the media. The count rates at the two detectors are recorded for each of the known conditions. Non-zero values of "correction" are indicated when count rates at both detectors deviate from count rates indicative of perfect contact with the wall of the wellbore, which in devising the empirical relationship are found by inserting the tool in the media with no "artificial mud cake" interposed between the skid and any of the media.

A drawback to the bulk density instruments known in the art derived from the Wahl '625 patent is that they generally require that the wall of the wellbore be reasonably smooth, and that the mud filtrate typically not exceed about one inch in thickness. The bulk density instruments known in the art also typically require that the skid be in substantially coaxial contact with the wall of the wellbore. Smooth wall, thin mudcake and coaxial contact are necessary for accurate measurement using the density instruments known in the art, because the previously described empirical relationship, used to determine bulk density and correction from the count rates at the detectors, is devised with the simplifying condition that the mud cake interposed between the wellbore wall (and therefore the earth formation) and the skid has substantially equal thickness at both of the detectors and at the source. In particular, if the wellbore wall is not smooth, or if the skid is in tilting (non-coaxial) contact with the wall of the wellbore, the measurements made by the bulk density instruments known in the art are subject to error. The error results from the fact that the source, or either of the detectors may be exposed to a different thickness of mud cake to the wellbore wall. As is known in the art, a rough wellbore wall is the rule rather than the exception, making the bulk density instruments known in the art particularly subject to this cause of error.

Another drawback to the bulk density well logging instruments known in the art is that they typically require complex, difficult to maintain mechanisms for placing the skid into firm contact with the wall of the wellbore. These mechanisms can include so-called "articulated" linkages, and hydraulically powered arms extending across the wellbore on the side of the tool opposite to the skid.

Yet another drawback to the bulk density well logging instruments known in the art is that the skids are typically formed to have a particular radius of curvature in the surface of the skid which is placed in contact with the wall of the wellbore. The radius of curvature is intended to provide "perfect" contact with the wall of a common diameter wellbore, this diameter typically being 7⅞ inches. If the particular wellbore being logged has a different diameter than that which would match the radius of curvature of the skid, perfect contact of the skid with the wellbore wall is unlikely.

Accordingly it is an object of the present invention to provide a bulk density well logging instrument which does not require complex articulated linkages to force a skid into contact with the wellbore wall.

It is a further object of the present invention to provide a bulk density well logging instrument which can make accurate measurements even if the instrument is in non-coaxial (tilted) contact with the wellbore wall.

It is yet another object of the present invention to provide a bulk density well logging instrument which is relatively insensitive to differences in radius of curvature between the wellbore and the instrument skid.

SUMMARY OF THE INVENTION

The present invention is a method and apparatus for determining density of an earth formation penetrated by a wellbore. The method includes the steps of irradiating the formation with gamma rays. The gamma rays have an energy magnitude conducive to Compton scattering. Gamma ray counts are measured at axially spaced apart locations from the source. Two of the axially spaced apart locations are each at an equal axial distance and are in opposite axial directions from one another relative to the source. The equal distance is smaller than the axial spacing of at least one other one of the spaced apart locations. The counts are scaled into an apparent bulk density for each one of the spaced apart locations. Differences are calculated in the apparent density between each one of the spaced apart locations and the apparent density at every other one of the spaced apart locations. A correction factor for is determined for the apparent density at each one of the spaced apart locations, thereby determining the density of the earth formation. In a preferred embodiment of the invention, the step of determining correction factors is performed by a neural network using the differences in apparent density as an input vector.

The apparatus for measuring density of an earth formation penetrated by a wellbore comprises an elongated sonde adapted to traverse the wellbore, an elongated shield disposed in the sonde and adapted to contact a wall of the wellbore, the shield consisting of a high-density material absorptive of gamma rays and a plurality of windows at axially spaced apart locations along the shield. The windows open to a surface of the shield which contacts the wall of the wellbore. The apparatus also includes a source of gamma rays disposed within one of the windows, a first near-spliced gamma ray detector positioned in another one of the windows axially proximal to the source, a second near-spaced gamma ray detector positioned in yet another one of the windows, the second near-spaced detector being axially spaced apart from the first near-spaced detector by an equal amount and in opposite direction to the first near-spaced detector. The apparatus also includes at least one far-spaced gamma ray detector positioned in another one of the windows at a greater axial spacing from the source and in the same direction from the source as the first near-spaced detector. The apparatus includes a means for scaling counts generated by each one of the detectors into an apparent density for each detector. The means for scaling includes means for calculating an indication of tool tilt and an indication of roughness of the wall of said wellbore corresponding to differences in apparent density between the first near-spaced and the second near-spaced detector. The means for scaling also includes means for calculating a correction factor for apparent density at the at least one far-spaced detector.

DESCRIPTION OF THE PREFERRED EMBODIMENT

Figure 1:
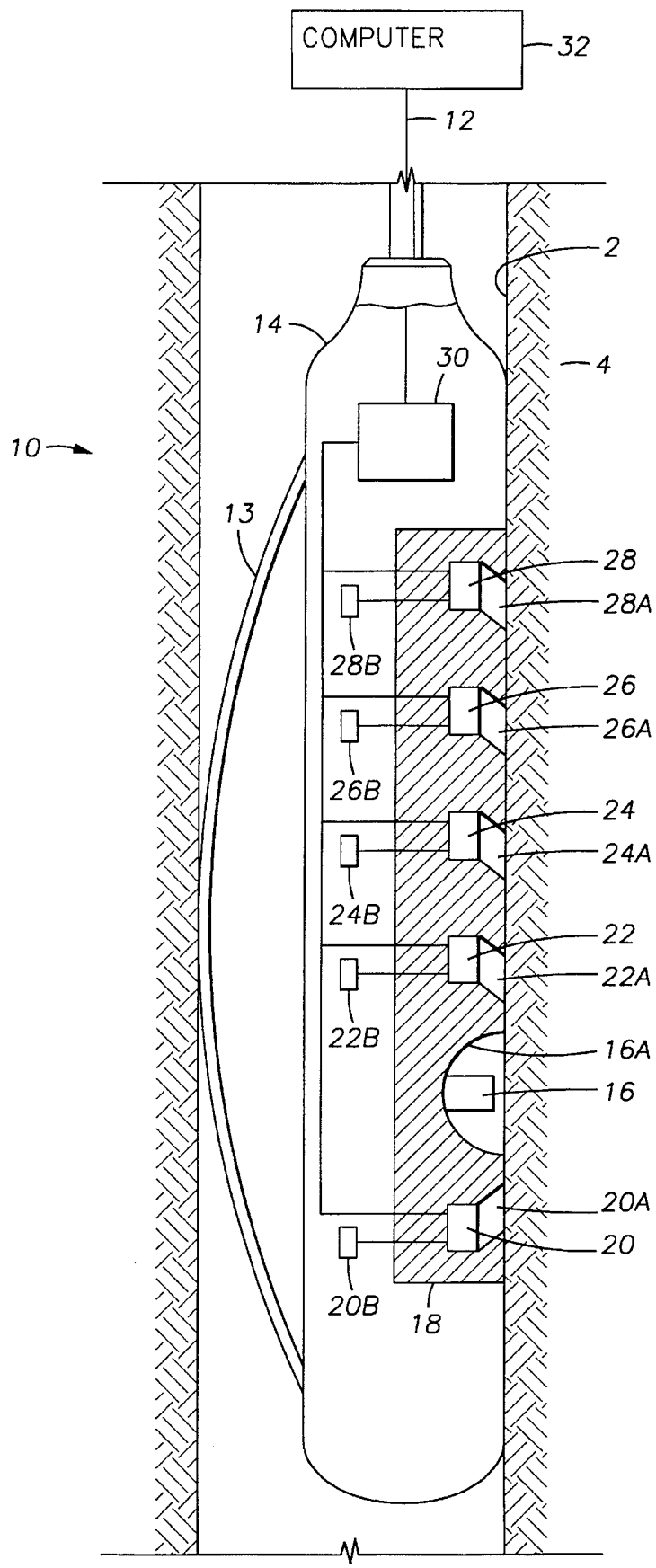
FIG. 1 shows an apparatus according to the present invention having a gamma ray source and a plurality of detectors at spaced apart locations.

The present invention can be better understood by referring to FIG. 1. A density logging apparatus 10 includes an elongated tool housing, or sonde 14, adapted to traverse a wellbore 2 drilled through earth formations 4. The sonde 14 can be attached to one end of an armored electrical cable 12. The cable 12 can be used to lower the sonde 14 into the wellbore 2, to conduct electrical power to the tool 10 and to carry signals transmitted by the tool 10 to the earth's surface for observation and recording, as is understood by those skilled in the art.

An axially elongated shield 18, typically composed of a very dense material such as tungsten, is disposed in the sonde 14. The shield 18 is preferably radially displaced to one side of the sonde 14 to enable contact with the wall of the wellbore 2. The shield 18 includes a number of windows, such as those shown at 20A, 22A, 24A, 26A and 28A, through which gamma rays can pass relatively unimpeded.

As is understood by those skilled in the art, the windows can be formed so as to open towards likely directions of origin of gamma rays coherently scattered by the earth formation 4. The side of the shield 18 on which the open ends of the windows are located typically is positioned in the wellbore 2 proximally to the wellbore 2 wall. As is understood by those skilled in the art, gravity tends to urge the shield 18 into contact with the wall of the wellbore 2 because the shield 18 is radially offset inside the sonde 14. As is understood by those skilled in the art, the sonde 14 can optionally be provided with a bowspring 13 or similar eccentralizing device disposed on the sonde 14 radially opposite to the shield 18 to urge the shield 18 into contact with the wall of the wellbore 2 when gravity does not provide sufficient force, such as in substantially vertical wellbores.

Disposed inside the shield 18 at the inner end of each window is a gamma ray detector, such as a "0th" detector 20, a 1st detector 22, a 2nd detector 24, a 3rd detector 26 and a 4th detector 28. The detectors can be geiger-mueller type counters or, preferably, scintillation counters. Each detector can include a corresponding high voltage power supply such as 20B, 22B, 24B, 26B and 28B, as is understood by those skilled in the art. The detectors can be electrically connected to a telemetry unit 30 which applies electrical signals to the cable 12 corresponding to the numbers of counts registered by each detector in response to detected gamma rays.

As is understood by those skilled in the art, circuitry (not shown) associated with transmission of counts from scintillation counter gamma ray detectors can include a multichannel pulse-height analyzer (not shown) for characterizing the apparent energy of each gamma ray detected by each one of the detectors. As is also understood by those skilled in the art, the telemetry unit 30 can send signals to the earth's surface corresponding to the apparent energy of each of the gamma rays counted by each detector for analysis of such properties as photoelectric effect. Using scintillation counters as detectors or using pulse-height analyzers is a matter of convenience for the system designer and is not to be construed as a limitation on the present invention.

A source of high energy gamma rays 16 can be disposed in the shield 18 in a window such as the one shown at 16A. The source 16 preferably can be a radioisotope such as cesium-137 which emits gamma rays having uniform energy of about 667 thousand electron volts (keV). The energy of the gamma rays emitted from the cesium-137 source, as is understood by those skilled in the art, is suited to produce Compton scattering of the gamma rays by interaction with electrons orbiting atoms in the formation 4.

Window 16A is formed to allow gamma rays from the source 16 to enter the earth formation 4 proximal to the open end of the window 16A, but substantially excludes passage of gamma rays in any other direction, particularly directly along the shield 18 towards the detectors. The shield 18 therefore substantially excludes entry of gamma rays into the detectors from any other direction but from the windows in the shield 18.

Gamma rays leave the source 16 and enter the formation 4. Some of the gamma rays can be Compton scattered by electrons orbiting atoms of the earth formation 4, and return to one of the detectors. If there is substantially perfect contact between the shield 18 and the earth formation 4, and if the earth formation 4 is substantially homogeneous, the counting rate which would be observed at each one of the detectors would generally be related to the electron density of the earth formation 4 in contact with the shield 18 and the distance between the source 16 and the particular detector. The relationship of count rates at any one of the detectors can be, expressed by the equation:

$$I=I_o e^{-\mu x} \qquad (2)$$

where I is the count rate at the detector having a spacing x from the source, $I_o$ is the count rate at zero spacing from the source 16, and μ is an "absorption" coefficient which is related to the electron density of the formation 4 in contact with the shield 18. For most materials from which the earth formation 4 is typically composed, the electron density is directly related to bulk density, so the measurements of detector count rate can be directly converted to measurements of apparent bulk density of the earth formation 4. Calculation of the apparent bulk density from the gamma ray counting rates at each detector can be performed according to equation (2) by a computer 32 which is electrically connected to the telemetry unit 30. Preferably the computer 32 is located at the earth's surface, but the computer 32 could alternatively be located in another portion of the tool 10. The precise manner in which the computer 32 determines the bulk density of the earth formation 4 will be further explained.

As is understood by those skilled in the art, gamma rays which are Compton scattered through the earth formation 4 and reach a detector having a longer spacing to the source 16, such as the 4th detector 28, typically travel through a greater thickness (or radial "depth") of the formation 4 away from the wall of the wellbore 2 than gamma rays which reach a more closely spaced detector such as the 2nd detector 24. The radial thickness of the earth formation 4 to which a particular detector is responsive is therefore related to the spacing between the source 16 and the particular detector.

In a novel aspect of the present invention, the 0th detector 20 is positioned at a spacing from the source 16 equal to the spacing from the source 16 of the first detector 22. The 0th detector 20 is on the side of the source 16 opposite to the 1st detector 22. Since the 0th detector 20 and the 1st detector 22 have substantially equal spacings to the source 16, they respond to substantially equal thicknesses or "depths" of investigation into the earth formation 4. If the shield 18 is in substantially coaxial contact with a smooth wall in the wellbore 4, then the gamma ray count rates at the 0th detector 20 and at the 1st detector 22 should be substantially equal. In the present embodiment of the invention, the spacing between the source 16 and the 0th detector 20, and between the source 16 and the 1st detector 22 can be about five inches, and is typically selected to make the 0th detector 20 and the 1st detector 22 primarily responsive to the density of a drilling fluid and deposited solids ("mud cake") from the drilling fluid present on the wall of the wellbore 2. The drilling fluid and deposited solids will be further explained.

As is understood by those skilled in the art, the wellbore 2 typically includes portions in which the wall of the wellbore 2 is not smooth. If the wall of the wellbore 2 is not smooth, the shield 18 will not make perfect contact with the wall of the wellbore 2 over the entire length of the shield 18. Each one of the detectors may therefore respond to gamma rays which at least partially scatter through different thicknesses of the drilling fluid (not shown) typically filling the wellbore 2 and thereby located in "pockets" in the rough wall of the wellbore 2.

As is also understood by those skilled in the art, earth formations 4 which are permeable typically can have a layer of solids (not shown) deposited on the wall of the wellbore 2 as a result of differential fluid pressure frown the drilling fluid (not shown), the layer of solids referred to as "mud filtrate" or "mud cake". The mud cake can therefore be interposed between the shield 18 and the wall of the wellbore 2. If the wellbore 2 wall is not smooth, or if the shield 18 is not in axial alignment with the wall of the wellbore 2 (a condition which is known in the art as tool "tilt"), then the gamma ray counts at the 0th detector 20 can be different than the counts at the 1st detector 22 because different thicknesses of mudcake will be interposed between the shield 18 and the wellbore 2 wall at the 0th detector 20 and the 1st detector 22.

The magnitude of differences in counts at the 0th detector 20 and at the 1st detector 22 can typically be correlated to known conditions of roughness of the wellbore 2 wall and known amounts of tool tilt. The magnitude of differences between counts at the 1st detector 20, and at the 2nd (24), 3rd (26) and 4th (28) detectors can also be correlated to known thicknesses of mud cake. In the present invention, a neural network can be "trained" to perform the correlation to the known values of tool tilt, mud cake thickness and roughness of the wellbore 2 wall in order to calculate correction factors for count rates at each of the detectors. The correction factors compensate the apparent density measurements from each detector for wall roughness, tool tilt and mud cake, so that the true bulk density of the earth formation 4 can be determined. The neural network will be further explained.

In order to characterize the response of the detectors to roughness, tool tilt and mud cake, a count rate response of each detector with respect to bulk density must first be determined. As is understood by those skilled in the art, one method of determining a response of count rate with respect to bulk density for each detector is to insert the tool 10 into appropriately machined "blocks", first of one material having density at the upper end of the range of densities of typical earth formations ("high density") and then into another material having a density at the lower end of the range of densities of earth formations ("low density"). Materials typically used for determining the response can include aluminum as the high density material and magnesium as the low density material. The counting rates of each detector in each block are used to calibrate an empirical relationship of counting rate with respect to density.

In the present invention, the count rates at each detector are conducted to the computer 32. The counts are scaled by the computer 32 into measurements of apparent density according to equation (2). The characteristic response for each particular detector is further calibrated according to the empirical relationship determined in the "blocks", as previously described.

Values of apparent bulk density determined for each one of the detectors are subtracted from values of apparent bulk density for each other one of the detectors to generate an "input vector" for the neural network. For example, in the present embodiment of the invention having 0th through 4th detectors, the input vector could consist of the apparent density differences: (4th–0th), (4th–1st), (4th–2nd), (4th–3rd), (3rd–0th), (3rd–1st), (3rd–2nd), (2nd–0th), (2nd–1st) and (1st–0th). The differences typically exhibit "patterns" each of which is characteristic of a particular condition of contact between the shield 18 and the wall of the wellbore 2.

The neural network in the present invention can be a program resident on the computer 32. A program which can perform the neural network function of the present invention, tier example, is written by California Scientific Software, Nevada City, Calif. and sold under the trade name "Brain Maker". It is contemplated that other neural network programs can also perform the functions required by the present invention, and the program suggested herein is not to be construed as a limitation on the present invention.

Figure 2:
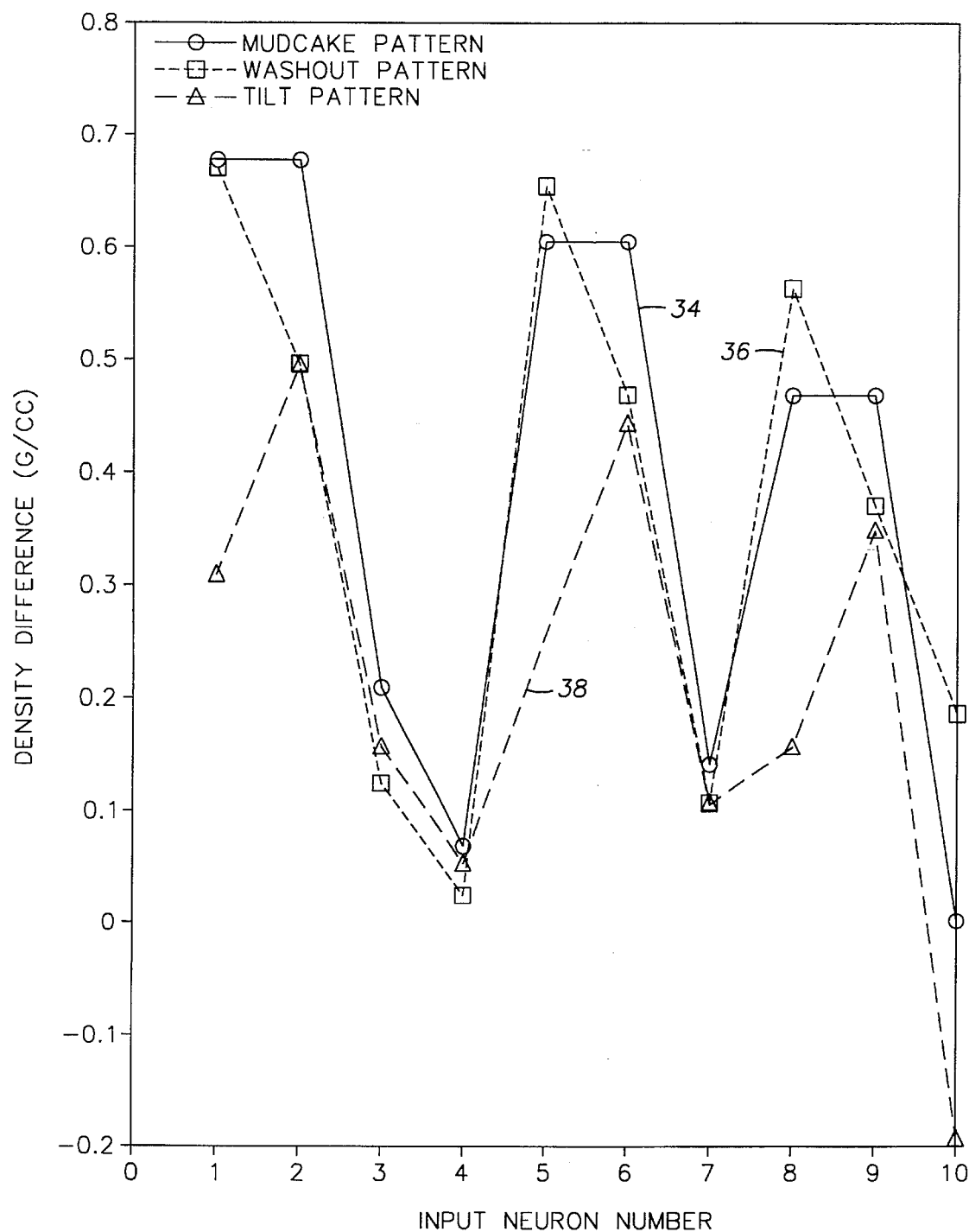
FIG. 2 shows a graph of the difference in apparent bulk density between pairs of detectors in the apparatus of the present invention for various types of conditions in a wellbore which cause imperfect contact between a detector shield and the wellbore wall.

Typical neural network "patterns" of differences in apparent densities can be observed by referring to FIG. 2. The graph in FIG. 2 identifies on the coordinate axis the detector pair for which the apparent density difference is indicated, and on the ordinate axis shows the value of the density difference for that particular pair of detectors. A typical pattern indicative of mud cake present on a smooth wellbore wall is shown at 34. A typical pattern indicative of rough wellbore wall is shown at 36, and a typical pattern indicative of tool tilt is shown at 38.

Initial "training" of the neural network can be performed by numerical simulation of the response of the tool, configured as shown in FIG. 1, using a so-called "linear count rate attenuation model". The linear count rate attenuation model estimates the count rate at a particular detector according to the relationship in equation (2). The system designer can select at will the values of source to detector spacing and bulk density used to determine the count rate at the particular detector. The linear count rate attenuation model enables the system designer to include simulation of Compton scattered gamma rays through a plurality of "layers" each having a different density than the other layers, thereby enabling simulation of mud cake and rough wellbore wall. The parameters used for initial training of the neural network of the present embodiment are shown in the Table 1.

TABLE 1

| | TRAINING PARAMETERS | TEST PARAMETERS |
|---|---|---|
| DETECTOR SPACING (inches) | –5 (0th), 5 (1st), 8 (2nd), 11 (3rd), 14 (4th) | –5, 5, 8, 11, 14 |
| MUDCAKE DENSITY (gm/cc) | 1.0, 1.5, 2.0, 2.5 | Random 1–2 |
| MUDCAKE THICKNESS (inches) | 0.25, 0.5, 0.75, 1.00 | Random 0–1 |
| TILT ANGLE | Angles resulting in standoff at source of 0.25 and 0.5 inches | Random angle resulting in standoff between 0 to 0.5 inches |
| FORMATION DENSITY (gm/cc) | 2.0, 2.2, 2.4, 2.6, 2.8, 3.0 | Random 2–3 |

After training, the neural network can be used while logging with the tool (10 in FIG. 1) in the wellbore (2 in FIG. 1). Count rates from each detector are used to generate the "input vector" as previously described herein, and the input vector is transferred to the neural network. In the present embodiment of the invention, as previously explained, the neural network can form part of the programming of the computer (shown as 32 in FIG. 1).

The output generated by the neural network comprises a correction factor for the apparent bulk density corresponding to each detector. Each correction factor indicates the difference between the true density of the earth formation 4 and the apparent density as indicated by the count rate at each detector. It is contemplated that a log quality indicator can be generated by determining, for example, the standard deviation of the correction factors, wherein smaller standard deviation is indicative of more reliable measurements from the tool. Smaller standard deviation is indicative of smaller differences between "correct" density and indicated density for each detector, which indicates more "perfect" contact between the shield (18 in FIG. 1) and the wall of the wellbore (2 in FIG. 1).

Referring again to FIG. 1, as the tool 10 is withdrawn through the wellbore 2, the process of scaling detector count rates into apparent densities and calculating correction factors in the neural network can be repeated, so that a log of bulk density of the earth formation 4 as a function of depth in the wellbore 2 can be generated.

The preferred embodiment of the tool 10 can include three far-spaced detectors, the 2nd detector 24 spaced 8 inches from the source 16, the 3rd detector 26 spaced 11 inches from the source and the 4th detector spaced 14 inches from the source 28. The number of far-spaced detectors and their spacings from the source 16 were selected to improve the accuracy of correction calculation by the neural network and to provide accurate bulk density measurements for mud cake thicknesses of up to one inch. It is contemplated that selection of longer spacings, particularly for the 4th detector 28 can provide accurate bulk density measurements in cases where the mud cake exceeds one inch in thickness. As is understood by those skilled in the art, increasing the spacing of the detectors can reduce the vertical resolution of the density measurement. Including a plurality of far-spaced detectors as in the present embodiment can provide an instrument capable of a combination of improved vertical resolution measurements for thin mud cake conditions and accurate measurements for thick mud cake conditions.

TEST RESULTS

Figure 3:
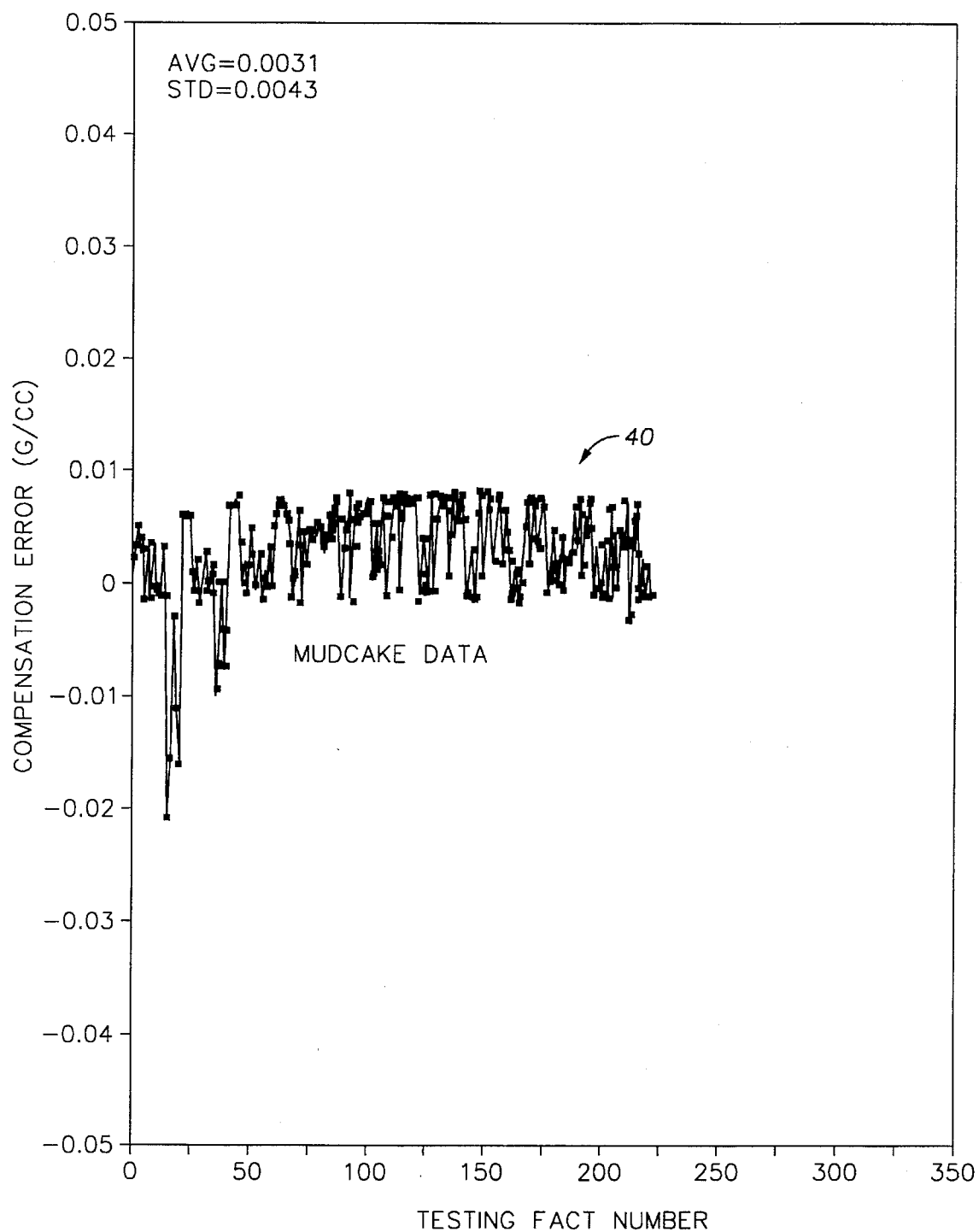
FIG. 3 shows a graph comparing measured response of the apparatus according to the present invention with simulated response according to a linear attenuation model. The comparison includes conditions of "mudcake" interposed between the detector shield and the wellbore wall.
Figure 4:
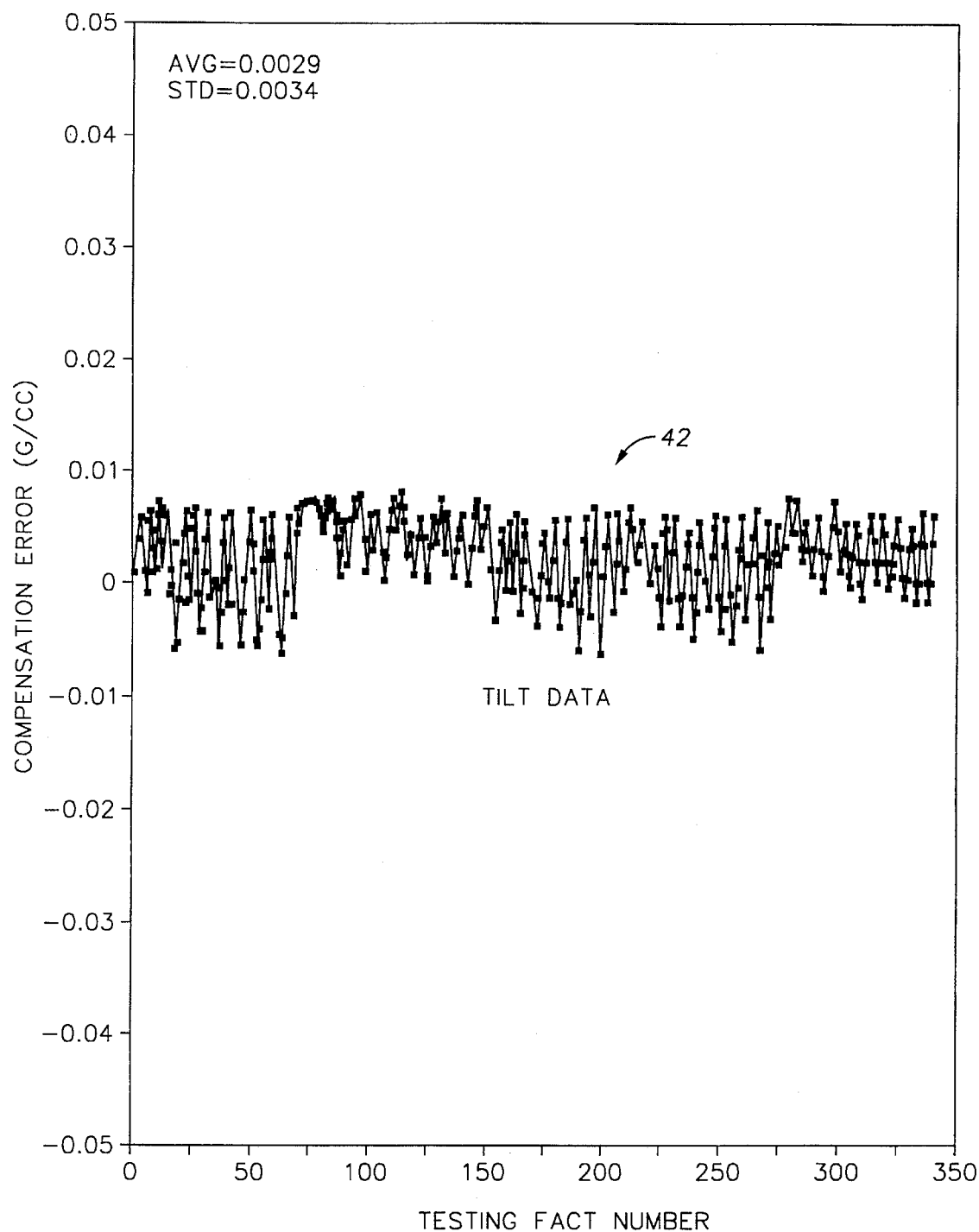
FIG. 4 shows a graph comparing measured response of the apparatus according to the present invention with simulated response according to a linear attenuation model. The comparison is for conditions of non-coaxial contact between the detector shield and the wall of the wellbore.

A simulation of the neural network response to the simulated conditions described in Table 1 can be observed in FIG. 3 and FIG. 4. The graph in FIG. 3 represents, for various thickness and densities of mudcake, the difference in the correction factor calculated by the neural network for the 4th detector (28 in FIG. 1) in response to a set of test parameters selected randomly from the range of values described for the various parameters in Table 1, compared with the correction factor calculated by the linear attenuation model for the same selected parameters. The average error calculated was less than 0.005 gm/cc. FIG. 4 is a graph of a similar set of correction factor difference calculations for randomly selected values of tool tilt. The average error calculated for tool tilt was less than 0.004 gm/cc.

The present invention provides an apparatus which enables determination of density of earth formations which does not require complicated, difficult to produce articulated linkages. The apparatus of the present invention can also determine bulk density of earth formations under conditions where the wellbore wall is not smooth or the tool is not in coaxial contact with the wall of the wellbore.

It is to be understood that the apparatus of the preferred embodiment of the invention is not limited to the exact configuration of detectors disclosed herein. The present invention particularly requires detectors which are axially positioned relative to the source (16 in FIG. 1) as are the 0th detector (20 in FIG. 1) the 1st detector (22 in FIG. 1) in order to determine tool tilt and roughness of the wellbore wall. The present invention also requires at least one additional detector located as are any one of the 2nd (24 in FIG. 1), 3rd (26 in FIG. 1) or 4th (28 in FIG. 1) detectors in order to generate an apparent measure of bulk density, and a correction factor generated by count rates from the 0th (20 in FIG. 1) and 1st (22 in FIG. 1) detectors which can be applied to the apparent density generated by the additional detector. The use of three "far-spaced" detectors in addition to the 0th (20 in FIG. 1) and 1st (22 in FIG. 1) is a matter of convenience for the system designer and typically results in improved accuracy of response of the neural network. One far-spaced detector is required as a minimum, and it is contemplated that other numbers of far-spaced detectors will also function according to the present invention.

Therefore the present invention should be limited in scope only by the claims appended hereto.

What is claimed is:

1. An apparatus for measuring density of an earth formation penetrated by a wellbore, comprising:

an elongated sonde adapted to traverse said wellbore;

an elongated shield disposed in said sonde and adapted to contact a wall of said wellbore, said shield comprising a material impeding passage of gamma rays therethrough, said shield comprising a plurality of windows at axially spaced apart locations along said shield, said windows open to a surface of said shield adapted to contact said wall of said wellbore, said windows enabling passage of gamma rays therethrough;

a source of gamma rays disposed within a first one of said windows;

a first near-spaced gamma ray detector positioned in a second one of said windows axially proximal to said first one of said windows so that said first detector is significantly responsive to gamma rays scattered radially proximal to said wellbore wall;

a second near-spaced gamma ray detector positioned in a third one of said windows, said third one of said windows axially spaced apart from said first one of said windows at a substantially equal distance and in the opposite direction to axial spacing of said second one of said windows relative to said first one of said windows;

at least one far-spaced gamma ray detector positioned in a fourth one of said windows at a greater axial spacing from said source and in the same direction from said source as said first near-spaced detector so that said far-spaced detector is substantially responsive to gamma rays scattered in said earth formation; and means for scaling counts generated by each one of said detectors into an apparent density at each one of said detectors, said means for scaling including means for determining tool tilt and roughness of said wall of said wellbore corresponding to differences in apparent density between said first near-spaced and said second near-spaced detector, said means for scaling including means for calculating a correction factor for said apparent density from said at least one far-spaced detector thereby to calculate density of said earth formation.

2. The apparatus as defined in claim 1 further comprising:

a second far-spaced detector and a third far-spaced detector axially positioned in corresponding windows in said shield, said second and third far-spaced detectors axially located between said first near-spaced and said first far-spaced detectors;

means for scaling counts from said second and said third far-spaced detectors into apparent density at each of said second and said third far-spaced detectors; and means for calculating correction factors for said apparent density at said second and at said third far-spaced detectors.

3. The apparatus as defined in claim 1 wherein said detectors comprise scintillation counters.

4. The apparatus as defined in claim 3 further comprising a pulse height analyzer coupled to said scintillation counters.

5. The apparatus as defined in claim 1 wherein said means for scaling comprises a trained neural network, said means for scaling adapted to calculate a difference in apparent density between each one of said detectors and every other one of said detectors to provide an input vector to said trained neural network.

6. The apparatus as defined in claim 1 wherein said source comprises a substantially steady-state isotopic chemical source.

7. The apparatus as defined in claim 1 wherein said first and said second near-spaced detectors are spaced approximately five inches from said source and said at least one far-spaced detector is spaced approximately fourteen inches from said source.

8. A method of determining density of an earth formation penetrated by a wellbore comprising the steps of:

irradiating said earth formation with gamma rays from within said wellbore, said gamma rays having energy magnitude conducive to Compton scattering of said gamma rays by electrons orbiting atoms of said earth formation;

measuring counts of said gamma rays from within said wellbore at axially spaced apart locations from said source, two of said axially spaced apart locations each being at an equal distance and in opposite axial directions from one another relative to said source, said equal distance being smaller than axial spacing of at least one other one of spaced apart locations, said equal distance selected so that gamma rays detected therein are substantially affected by mud cake and drilling fluid in said wellbore, said at least one other one of said spaced apart location selected so that gamma rays detected therein are substantially affected by said earth formation;

calculating an apparent density from counts at each one of said two spaced apart locations and at said at least one other one of said spaced apart locations;

calculating differences in apparent density between each one of said two and said at least one other of said spaced apart locations, and each other one of said spaced apart locations; and determining a correction factor for apparent density at each one of said two and said at least one other of said spaced apart locations by comparing said differences in apparent density to values of density difference corresponding to known conditions of mud cake wellbore roughness and tool tilt.

9. The method as defined in claim 8 wherein said step of calculating apparent density comprises scaling said counts at said spaced apart locations according to a predetermined relationship.

10. The method as defined in claim 8 wherein said step of comparing to known conditions comprises recognition of patterns in a neural network trained according to said known conditions.

11. The method as defined in claim 8 further comprising determining presence of roughness on a wall of said wellbore by comparing difference in apparent density between each of spaced apart locations to values of difference corresponding to roughness.

12. The method as defined in claim 8 further comprising determining tilt between an axis of said spaced apart locations and a wall of said wellbore by comparing difference in apparent density between each of said spaced apart locations to values of difference corresponding to tilted contact.

13. The method as defined in claim 12 wherein said axis is substantially coaxial with said wall when said difference between apparent density between said two of said spaced apart locations is approximately equal to zero.

14. The method as defined in claim 8 further comprising the step of repeating all of said steps of irradiating, measuring, calculating apparent density, calculating difference and determining correction factors at a plurality of depths within said wellbore.

* * * * *